(No Model.)

J. M. DORAN.
TRAIN PIPE.

No. 571,755.

Patented Nov. 24, 1896.

Witnesses.

Inventor:
Joseph M. Doran
per Rhesa M. DuBois
Attorney.

UNITED STATES PATENT OFFICE.

JOSEPH M. DORAN, OF OGDEN, UTAH.

TRAIN-PIPE.

SPECIFICATION forming part of Letters Patent No. 571,755, dated November 24, 1896.

Application filed June 27, 1896. Serial No. 597,168. (No model.)

*To all whom it may concern:*

Be it known that I, JOSEPH M. DORAN, a citizen of the United States, residing at Ogden, in the county of Weber and State of Utah, have invented certain new and useful Improvements in Train-Pipes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a fluid-conduit composed of metallic piping-sections connected by a universal joint and adapted to take the place of the usual rubber pipe so largely used in train and other service where a flexible conduit is necessary. It is well known that rubber pipe, when used in such capacity or wherever used for conducting hot air or hot water, soon rots and becomes worthless, thereby entailing constant expense and care to keep it in order.

The object of my invention is to overcome such difficulties.

To this end my invention consists in providing a metallic universal pipe-joint or pipe composed of a series of connected and universally-movable sections constituting a continuous fluid-conduit of such a character as to be cheaply made, easy to operate and keep in order, and capable of long and severe wear.

Figure 1:
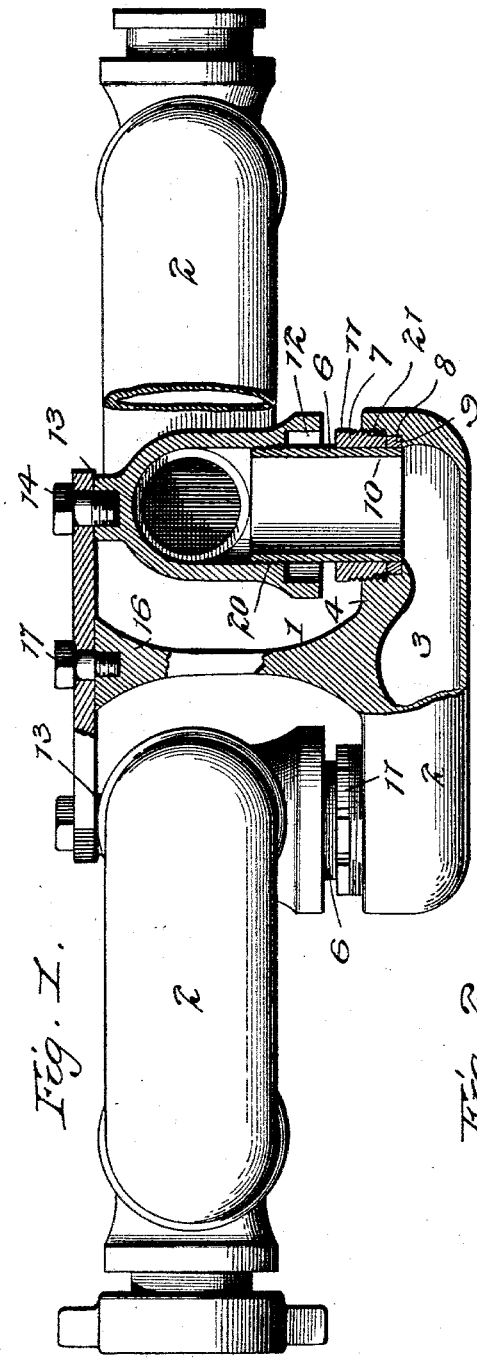
Figure 2:
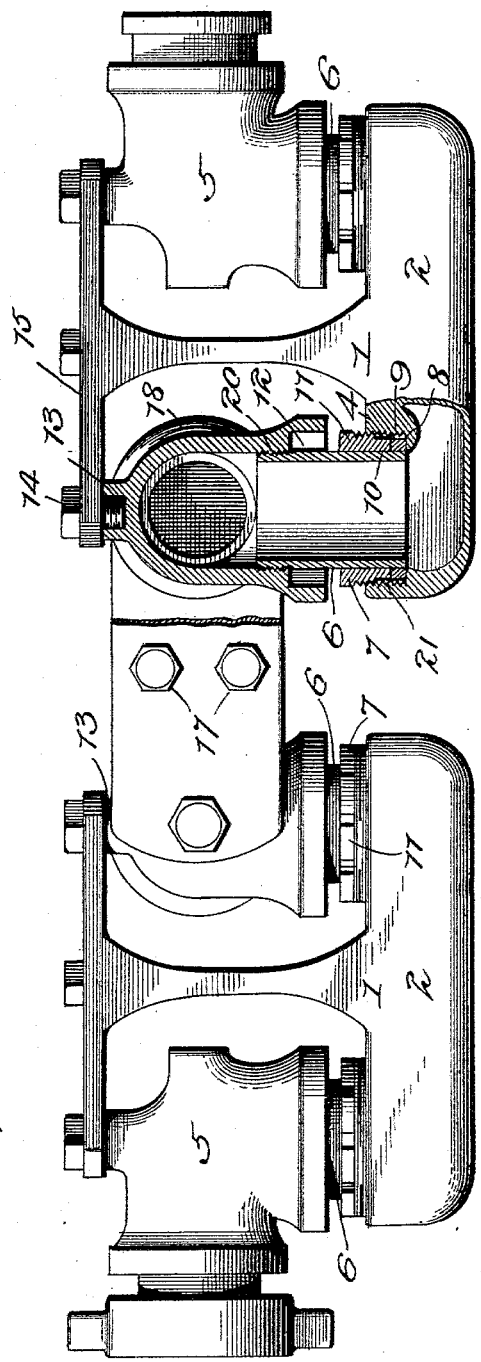

In the accompanying drawings, Figure 1 represents one side of my complete structure, in which parts are cut away and shown in dotted lines to better disclose the internal construction. Fig. 2 represents a top or plan view of my device, in which some of the parts are shown in section.

The reference-numeral 1 denotes one of a series of hollow T-shaped frames or joint members, each of which is formed, preferably, of a single casting. The cross-arm 2 of the casting is provided with a longitudinal passage 3, the ends of which extend through the inside wall 4 of the casting and communicate with an elbow 5 through the medium of what will be called, for convenience, a "nipple" 6. This nipple coincides with the bore of the elbow, to which it is rigidly secured by screw-threads 20, and is made steam and water tight by a stuffing-box consisting of an externally-threaded nut 7, which screws into internal threads 21 in the T-frame. A recess 8 is provided for the reception of a packing-ring 9. The inner end 10 of the nut is turned down smooth in order to enter the recess in the operation of compressing the packing when the nut is screwed in, and squared surfaces 11 are made on the outer end of the nut for the application of a wrench. An internal annular recess 12 is bored in the end of the elbow and is given a size and depth to easily receive the packing-nut when the latter is unscrewed in the operation of attending to the renewal of the packing or of taking the structure apart. The outer surface of the nipple is turned down smooth in order to closely fit the stuffing-nut, whereby a tight hinge-joint is made. On the opposite side of and in axial alinement with the nipple is an embossment 13, internally threaded to receive a bolt 14, which passes through a flat plate 15, forming two arms parallel with the cross-arm 2 of the frame 1. Thus the nipple and bolt constitute a pair of trunnions on which the elbow 5 rocks during the vibrations of the conduit. The plate 15 is rigidly fastened to the stem 16 of said casting by a pair of screw-bolts 17, and its opposite end is secured to a twin elbow 18, which is attached to the opposite side of the cross-arm on the T-frame by a screw-bolt and nipple in precisely the same way that the elbow before described is fastened, so that a description of one will suffice for both. It is apparent that this duplication of parts will greatly facilitate and cheapen the manufacture of the device in addition to making it much easier for repairs and attention. The left-hand elbow 18 is in turn connected to the hollow cross-arm of a duplicate T-shaped member, disposed to lie with the stem extending at right angles to the first member, by a duplicate thimble, bolt, and plate, and so on throughout, thereby constituting a chain conduit composed of universally-jointed sections capable of oscillation in all directions and performing the same functions of a flexible train-pipe.

The terminals of the conduit can be provided with any suitable connections by which a tight joint can be made between them and the two movable bodies to which they are attached.

What I claim as new, and desire to secure by Letters Patent, is—

The herein-described universal pipe-joint consisting of an elbow having a cylindrical nipple fixed therein, and projecting therefrom, and provided with an annular recess around the nipple, in combination with a T-shaped member having a hollow cross-arm, and provided with an opening to receive the nipple, whereby the two are made to communicate, and a stuffing-nut embracing the nipple and in engagement with the T-shaped member and adapted to recede into the annular recess when unscrewed, substantially as described.

In witness whereof I affix my signature in presence of two witnesses.

JOSEPH M. DORAN.

Witnesses:
S. H. HOBSON,
G. N. KIMBALL.